United States Patent [19]

Baird, Jr.

[11] Patent Number: 4,701,255
[45] Date of Patent: Oct. 20, 1987

[54] REFORMING WITH POLYMETALLIC CATALYSTS

[75] Inventor: William C. Baird, Jr., Baton Rouge, La.

[73] Assignee: Exxon Research and Engineering Company, Florham Park, N.J.

[21] Appl. No.: 933,380

[22] Filed: Nov. 21, 1986

[51] Int. Cl.$^4$ ............................................. C10G 35/08
[52] U.S. Cl. ..................................... 208/139; 208/138
[58] Field of Search ............................... 208/138, 139

[56] References Cited

U.S. PATENT DOCUMENTS 4,172,817 10/1979 Yates et al. .......................... 208/139

Primary Examiner—Curtis R. Davis
Attorney, Agent, or Firm—Llewellynn A. Proctor; Roy J. Ott

[57] ABSTRACT

A process for reforming a naphtha feed at reforming conditions by contacting said feed, and hydrogen, with a halogenated, supported platinum catalyst promoted with an agglomerated iridium component. The iridium component is agglomerated sufficient to exhibit a crystallinity greater than 50 percent, preferably greater than 75 percent, and more preferably 100 percent, as measured by x-ray.

19 Claims, No Drawings

REFORMING WITH POLYMETALLIC CATALYSTS

FIELD OF THE INVENTION

This invention relates to a process for reforming naphthas, or straight run gasolines, by reaction over polymetallic reforming catalysts to improve their octane number.

BACKGROUND

Catalytic reforming, or hydroforming, is a well established industrial process employed by the petroleum industry for improving the octane quality of naphthas or straight run gasolines. In reforming, a multi-functional catalyst is employed which contains a metal hydrogenation-dehydrogenation (hydrogen transfer) component, or components, substantially atomically dispersed upon the surface of a porous, inorganic oxide support, notably alumina. Noble metal catalysts, notably of the platinum type, are currently employed, reforming being defined as the total effect of the molecular changes, or hydrocarbon reactions, produced by dehydrogenation of cyclohexanes and dehydroisomerization of alkylcyclopentanes to yield aromatics; dehydrogenation of paraffins to yield olefins; dehydrocyclization of paraffins and olefins to yield aromatics; isomerization of n-paraffins; isomerization of alkylcycloparaffins to yield cyclohexanes; isomerization of substituted aromatics; and hydrocracking of paraffins which produces gas, and inevitably coke, the latter being deposited on the catalyst.

In a reforming operation, one or a series of reactors, providing a series of reaction zones, are employed. Typically, a series of reactors are employed, e.g., three or four reactors, these constituting the heart of the reforming unit. Each reforming reactor is generally provided with a fixed bed, or beds, of the catalyst, typically a platinum catalyst or a metal promoted platinum catalyst, which receive down-flow feed, and each is provided with a preheater or interstage heater, because the reactions which take place are endothermic. A naphtha feed, with hydrogen, or recycle hydrogen gas, is cocurrently passed through a preheat furnace and reactor, and then in sequence through subsequent interstage heaters and reactors of the series. The product from the last reactor is separated into a liquid fraction, and a vaporous effluent. The former is recovered as a $C_5^+$ liquid product. The latter is a gas rich in hydrogen, and usually contains small amounts of normally gaseous hydrocarbons, from which hydrogen is separated and recycled to the process to minimize coke production.

The sum-total of the reforming reactions occurs as a continuum between the first and last reactor of the series, i.e., as the feed enters and passes over the first fixed catalyst bed of the first reactor and exits from the last fixed catalyst bed of the last reactor of the series. During an on-oil run, the activity of the catalyst gradually declines due to the build-up of coke on the catalyst, and hence during operation, the temperature of the process is gradually raised to compensate for the activity loss caused by the coke deposition. Eventually, however, economics dictate the necessity of reactivating the catalyst. Consequently, in all processing of this type the catalyst must necessarily be periodically regenerated by burning off the coke at controlled conditions.

Two major types of reforming are generally practiced in the multi reactor units, both of which necessitate periodic reactiviation of the catalyst, the initial sequence of which requires regeneration, i.e., burning the coke from the catalyst. Reactivation of the catalyst is then completed in a sequence of steps wherein the agglomerated metal hydrogenation-dehydrogenation components are atomically redispersed. In the semi-regenerative process, a process of the first type, the entire unit is operated by gradually and progressively increasing the temperature to maintain the activity of the catalyst, decreased by the coke deposition, until finally the entire unit is shut down for regeneration, and reactivation, of the catalyst. In the second, or cyclic type of process, the reactors are individually isolated, or in effect swung out of line by various manifolding arrangements, motor operated valving and the like. The catalyst is regenerated to remove the coke deposits, and then reactivated while the other reactors of the series remain on stream. A "swing reactor" temporarily replaces a reactor which is removed from the series for regeneration and reactivation of the catalyst, until it is put back in series. The cyclic method of regeneration offers advantages in that the catalyst, because it can be continuously regenerated, and reactivated, without shutting down the unit, suffers no loss in production. Moreover, because of this advantage the unit can be operated at higher severities to produce higher $C_5^+$ liquid volume yields of high octane gasoline than semi-regenerative reforming units.

Catalysts constituted of platinum and iridium, with or without the presence of an additional metal, or metals, are known to be the most active of commercial reforming catalysts. The ability of iridium to promote platinum activity provides catalytic activities two to four times that of platinum and platinum-rhenium catalysts depending upon the platinum and iridium loadings selected. A major liability of platinum-iridium catalysts is the ease in which iridium is agglomerated upon exposure to oxygen at high temperatures. This fact has restricted the wide application of platinum-iridium catalysts, especially to exclude their use in cyclic reforming units, since time-consuming regeneration procedures are required to avoid damaging the iridium. These regeneration methods utilize lengthy, low temperature coke burns in the presence of chloride to maintain the iridium in highly dispersed state. Low oxygen concentrations in the combustion gas are also employed during the combustion period to hold the flame front temperature below about 800° F. (426.7° C.). The use of chloride during this prolonged burning period also creates a number of troublesome problems. For example, the use of scrubbing equipment is required to remove the corrosive chloride containing gases from the gas recycle stream. Moreover, volatile iron chlorides are formed by reaction of the chlorine with reactor walls, and the deposition of these iron salts on the reforming catalyst contributes to poor on-oil performance.

Platinum-iridium catalysts offer other benefits in addition to their high activity. The catalysts generate low levels of coke relative to other catalysts, e.g., platinum-rhenium catalysts which have enjoyed high commercial success, which has the effect of extending cycle length and directionally minimizing burn time where high temperatures can be employed. In contrast to platinum-rhenium catalysts, platinum-iridium systems are more sulfur tolerant, and the use of feed sulfur at the lower levels which become possible lowers the level of hydrogenolysis of the feed to methane. This results in higher $C_5^+$ liquid volume yields of the product.

There thus exists a need, among others, for a novel reforming process employing a catalyst offering high activity, high sulfur tolerance, low coke formation, high $C_5^+$ liquid volume yield, and rapid catalyst regeneration. Platinum-iridium catalysts admirably satisfy the first three of these five enumerated requirements, but do not provide as high $C_5^+$ liquid volume yields as some other catalysts, e.g., platinum-rhenium catalysts, and require lengthy periods for regeneration of the catalyst, e.g., as contrasted with platinum and platinum-rhenium catalysts.

OBJECTS

It is, accordingly, the primary objective of the present invention to provide a novel reforming process utilizing a catalyst which will fulfill these and other needs.

In particular, it is an object to provide a novel reforming process utilizing a catalyst which during on-oil use will provide high activity, high sulfur tolerance, low coke formation, high $C_5^+$ liquid volume yield, and rapid catalyst regeneration.

A more specific object is to provide a novel process employing a platinum-iridium catalyst for use during on-oil operations to provide these advantages, inclusive particularly of a process providing a more sulfur tolerant catalyst for which reason the rate of hydrogenolysis of a feed to methane is lowered and $C_5^+$ liquid volume yield increased, thereby broadening the usage of such catalysts to encompass cyclic reforming operations.

THE INVENTION

These and other objects are accomplished by contacting a hydrocarbon naphtha feed at reforming conditions with a platinum catalyst promoted with iridium agglomerated to exhibit a crystallinity greater than 50 percent, preferably greater than about 75 percent, and more preferably 100 percent, as measured by x-ray diffraction. A catalyst, the iridium component of which is agglomerated to exhibit a crystallinity greater than 50 percent, for purposes of defining the process of this invention, is one wherein greater than 50 percent of the iridium component, based on the total weight of the iridium component, is present on the catalyst as iridium crystallites of particle size greater than 30 Angstrom Units, as measured by x-ray diffraction. A catalyst, more than one-half of the total iridium component, by weight, of which has been agglomerated to increase the crystallite size of the iridium particles above 30 Angstrom Units, as measured by x-ray diffraction, is thus a catalyst useful in the process of this invention. A catalyst, the iridium component of which is agglomerated to exhibit a crystallinity greater than 75 percent, for purposes of defining the process of this invention, is one wherein greater than 75 percent of the iridium component, based on the total weight of the iridium component, is present in the catalyst as iridium crystallites of particle size greater than 30 Angstrom Units. And, a catalyst the iridium component of which is agglomerated to exhibit a crystallinity of 100 percent, for present purposes, is one wherein the total iridium component is present as crystallites of particle size greater than 30 Angstrom Units, as measured by x-ray diffraction.

Surprisingly, it has been found that the above enumerated advantages, and others, are provided by an iridium promoted platinum catalyst wherein an x-ray diffraction pattern shows that greater than 50 percent of the total iridium component of the catalyst, based on the weight of total iridium, becomes measurable by x-ray as relatively large or massive crystals with crystal diameters of 30 Angstrom Units, and greater. The crystallite size of the iridium agglomerates (largely Ir and $IrO_2$) on the catalyst employed in the process of this invention is sharply contrasted with that of the platinum in the active catalyst which is shown by chemisorption techniques to range in particle size diameter to a maximum of about 12 Angstrom Units (See *Journal of Catalysis*, 8, 348, 1967 by D. J. C. Yates and J. H. Sinfelt).

In the conventional iridium promoted platinum catalyst used in reforming no crystallinity is detectable since the iridium is well dispersed upon the support, the iridium crystallites normally measuring well within about the 5 to 20 Angstrom Unit size range. Beyond this upper limit, i.e., at about 30 Angstrom Unit size, the iridium crystallites become detectable by x-ray. Heretofore, iridium detection by the use of x-ray at this x-ray threshold detection level of even a low to moderate amount of iridium crystallites has indicated that the platinum-iridium catalyst was unsuitable, or certainly no longer suitable as a reforming catalyst. At this point it has been the practice to redisperse the agglomerated iridium component to reactivate the catalyst, and indeed a considerable body of art on techniques for dispersing the iridium agglomerates is evidenced by the large number of patents which have issued over the last two decades. The process of this invention, utilizing a platinum-iridium catalyst the iridium component of which exhibits crystallinity greater than 50 percent, as measured by x-ray, to provide advantages over iridium promoted platinum catalysts, the iridium component of which is non-agglomerated or only slightly agglomerated, is thus indeed surprising. It would appear that the advantages offered by an iridium promoted platinum catalyst, the iridium component of which is well dispersed, decreases as the iridium component agglomerates and the particle sizes thereof becomes greater than about 20 Angstrom Units. Surprisingly however, as the iridium agglomerates increase in size such that the iridium component exhibits crystallinity greater than 50 percent, as measured by x-ray, a shift occurs and the properties of the iridium promoted platinum catalyst begins to imrove; ultimately even to the extent that the platinum-agglomerated iridium catalyst is equal or superior to an otherwise equivalent platinum-iridium catalyst except it is one upon which the iridium component is well dispersed. It has thus been found that iridium promoted platinum catalysts similar in all respects except that the iridium component exhibits a crystallinity of 75 percent is superior to one the iridium component of which exhibits a crystallinity of 50 percent, and one the iridium component of which exhibits a crystallinity of 100 percent is superior to one the iridium component of which exhibits a crystallinity of 75 percent, as regards its activity, sulfur tolerance, coke formation, $C_5^+$ liquid volume yield, and regenerability. An iridium promoted platinum catalyst wherein the iridium component exhibits a crystallinity greater than about 75 percent has been found to be more highly active and provide better $C_5^+$ liquid selectivity than conventional platinum-rhenium catalysts, or their iridium-free analogs. This is also true of iridium promoted platinum catalysts wherein the iridium component exhibits a crystallinity of 100 percent, and indeed these catalysts are even superior to the more conventional platinum-iridium catalysts for use in on-oil operations in terms of overall performance based on yield, aromatization activity, and selectivity. The preferred platinum-iridium catalysts of the invention are thus those wherein the iridium component thereof is sufficiently agglomerated to provide crystallinities ranging from about 60 percent to 100 percent, preferably from about 75 percent to 100 percent.

The iridium component can be agglomerated in virtually any manner, one simple way being to heat the iridium-containing support, prior to or after addition of the platinum component, at temperatures in excess of about 425° C. in the presence of air or oxygen; excessive temperature in the presence of oxygen heretofore being a condition to be avoided to prevent or suppress iridium agglomeration. Thus, iridium can be impregnated, or otherwise dispersed onto a support and then calcined in air at temperatures in excess of 425° C., preferably 455° C., and more preferably 485° C., for about three or more hours. A preferred technique for forming the catalysts used in the process of this invention is to disperse the iridium into a support, or carrier, agglomerate same, and then to add the platinum by conventional techniques, suitably by impregnation. The platinum-agglomerated iridium catalyst can then be recalcined in air at generally similar conditions for from about 1 hour to about 24 hours, then reduced, suitably with a flowing stream of hydrogen at from about 485° C. to about 510° C., and then sulfided, suitably by contact with a hydrogen sulfide containing gas, e.g., an $H_2S/H_2$ blend to sulfur breakthrough from the exit side of the catalyst bed. Conversely, the order of addition of the platinum and iridium can be reversed. Thus, the platinum and iridium, in that order, can be sequentially impregnated onto the support and then treated as described to agglomerate the iridium component. Alternatively, the platinum and iridium can be coimpregnated and the catalyst then calcined in air, or an oxygen-containing gas at about 425° C. to about 510° C. preferably about 480° C. to about 510° C., and then reduced and sulfided as described. In all of the catalysts employed in the process of this invention, as suggested, the iridium component of the catalyst must display, a crystallinity, as measured by x-ray, greater than 50 percent, preferably greater than about 75 percent, more preferably about 100 percent. The catalyst is one which contains platinum as an essential component, generally in concentration ranging from about 0.05 percent to about 1 percent, preferably from about 0.3 percent to about 0.7 percent, based on the weight of the catalyst (dry basis). The catalyst also contains iridium as an essential component, generally in concentration ranging from about 0.01 percent to about 1 percent, preferably from about 0.1 percent to about 0.7 percent, based on the weight of the catalyst (dry basis). An additional metal, or metals, as modifiers or promoters can be added to the catalyst support, or carrier. Such metals include copper, tin, rhenium, palladium, rhodium, tungsten, ruthenium, osmium, silver, gold, gallium, lead, bismuth, antimony and the like. These modifiers, or promoters, are generally added in concentrations ranging from about 0.001 percent to about 1 percent, preferably from about 0.01 percent to about 0.7 percent, based on the weight of the catalyst composition (dry basis). Suitably, the salts or compounds of one or more of these metals are dissolved in a suitable solvent, preferably water, to form a solution, or each moiety is separately dissolved in a solution, the solutions admixed and the admixed solution used for impregnation of the carrier. The concentration of the salt or compound in the impregnation solution is adequate to impregnate a sufficient amount of the metals into the carrier, or support.

Halogen, preferably chloride, is an essential component, the halogen content of the catalyst generally ranging from about 0.1 to about 2.5 percent, preferably from about 0.7 to about 1.2 percent, based on the weight of the catalyst (dry basis).

Sulfur is a preferred, but not an essential component. The sulfur content of the catalyst generally ranges to about 0.2 percent, preferably from about 0.05 percent to about 0.1 percent, based on the weight of the catalyst (dry basis). The sulfur can be added to the catalyst by conventional methods, suitably by breakthrough sulfiding a bed of the catalyst with a sulfur-containing gaseous stream, e.g., hydrogen sulfide in hydrogen, performed at temperatures of from about 175° C. to about 560° C. and at pressures of from about 1 to about 40 atmospheres for the time necessary to achieve breakthrough, or the desired sulfur level.

The several components of the catalyst are composited with a refractory inorganic oxide support material, particularly alumina. The halogen component, particularly chlorine, is added along with the various components, or subsequent thereto, or both. The support can contain, for example, one or more of alumina, bentonite, clay, diatomaceous earth, zeolite, silica, activated carbon, magnesia, zirconia, thoria, and the like; though the most preferred support is alumina to which, if desired, can be added a suitable amount of other refractory carrier materials such as silica, zirconia, magnesia, titania, etc., usually in a range of about 1 to 20 percent, based on the weight of the support. A preferred support for the practice of the present invention is one having a surface area of more than 50 $m^2/g$., preferably from about 100 to about 300 $m^2/g$., a bulk density of about 0.3 to 1.0 m/ml, preferably about 0.4 to 0.8 g/ml, an average pore volume of about 0.2 to 1.1 ml/g., preferably about 0.3 to 0.8 ml/g., and an average pore diameter of about 30 to 300 A.

The metal components can be composited or intimately associated with the porous inorganic oxide support or carrier by various techniques known to the art such as ion-exchange, coprecipitation with the alumina in the sol or gel form, and the like. For example, the catalyst composite can be formed by adding together suitable reagents such as a salts of the required metals and ammonium hydroxide or ammonium carbonate, and a salt of aluminum such as aluminum chloride or aluminum sulfate to form aluminum hydroxide. The aluminum hydroxide containing the salts can then be heated, dried, formed into pellets or extruded, and then calcined in air or other atmosphere. The metal hydrogenation-dehydrogenation components are preferably added to the catalyst by impregnation, typically via an "incipient wetness" technique which requires a minimum of solution so that the total solution is absorbed, initially or after some evaporation.

Suitably, the platinum and iridium, and other metal components, if any, are deposited on a previously pilled, pelleted, beaded, extruded, or sieved particulate support material by the impregnation method. Pursuant to the impregnation method, porous refractory inorganic oxides in dry or solvated state are contacted, either alone or admixed, or otherwise incorporated with a metal or metals-containing solution, or solutions, and thereby impregnated by either the "incipient wetness" technique, or a technique embodying absorption from a dilute or concentrated solution, or solutions, with subsequent filtration or evaporation to effect total uptake of the metallic components.

The impregnation of the platinum and iridium components, and other components, into a carrier is carried out by impregnating the carrier with a solution or solutions, of the respective salts or compounds of the elements or metals to be incorporated. Salts, acids or compounds of each metal can be dissolved in a solution, or the salts, acids or compounds can be separately dissolved in solutions, the solutions admixed, and the admixed solution used for impregnation of the carrier. In other words, iridium is added initially using conventional techniques, suitably the iridium component is then agglomerated, and then the other metals are added simultaneously or sequentially, suitably by impregnation. The amount of impregnation solution used should be sufficient to completely immerse the carrier, usually within the range from about 1 to 20 times of the carrier by volume, depending on the metal concentration in the impregnation solution. The impregnation treatment can be carried out under a wide range of conditions including ambient or elevated temperatures and atmospheric or supratmospheric pressures.

Halogen can be introduced into the catalyst by any method at any time of the catalyst preparation, for example, prior to, following or simultaneously with the impregnation of the platinum and iridium, or additional metal or metals components. In the usual operation, the halogen component is introduced simultaneously with the incorporation of the metal components. Halogen can also be introduced by contacting a carrier material in a vapor phase or liquid phase with a halogen compound such as hydrogen fluoride, hydrogen chloride, ammonium chloride, or the like.

The catalyst, after impregnation, is dried by heating at a temperature above about 27° C., preferably between about 65° C. and 150° C., in the presence of nitrogen or oxygen, or both, in air stream or under vacuum. The catalyst after addition of the iridium is calcined at a temperature between about 450° C. to 650° C., preferably about 450° C. to 560° C., in the presence of oxygen in an air stream or in the presence of a mixture of $O_2$ and inert gas. This calcination or activation is conducted for periods ranging from about 1 to about 24 hours in either flowing or static gases. Reduction is performed by contact with flowing hydrogen at temperatures ranging from about 175° C. to about 560° C. for periods ranging from about 0.5 to about 24 hours at about 1–40 atm. The catalyst can be sulfided by use of a blend of $H_2S/H_2$ and performed at temperature ranging from about 175° C. to about 560° C. at about 1–40 atm. for a time necessary to achieve breakthrough, or the desired sulfur level. Post-sulfiding stripping can be employed if desired at conditions similar to those for reduction of the catalyst.

These catalysts can be used in semi-regenerative, cyclic, semi-cyclic, or continuous bed reforming. Unlike prior iridium-containing catalysts, these catalysts are particularly useful in cyclic reforming operations.

The feed or charge stock can be a virgin naphtha, cracked naphtha, a Fischer-Tropsch naphtha, or the like. Typical feeds are those hydrocarbons containing from about 5 to 12 carbon atoms, or more preferably from about 6 to about 9 carbon atoms. Naphthas, or petroleum fractions boiling within the range of from about 27° C. to about 235° C., and preferably from about 50° C. to about 190° C., contain hydrocarbons of carbon numbers within these ranges. Typical fractions thus usually contain from about 20 to about 80 Vol.% paraffins, both normal and branched, which fall in the range of about $C_5$ to $C_{12}$, from about 10 to 80 Vol.% of naphthenes falling within the range of from about $C_6$ to $C_{12}$, and from 5 through 20 Vol.% of the desirable aromatics falling within the range of from about $C_6$ to $C_{12}$.

The reforming runs are initiated by adjusting the hydrogen and feed rates, and the temperature and pressure to operating conditions. The run is continued at optimum reforming conditions by adjustment of the major process variables, within the ranges described below:

| Major Operating Variables | Typical Process Conditions | Preferred Process Conditions |
|---|---|---|
| Pressure, Psig | 50–750 | 100–300 |
| Reactor Temp., °C. | 400–600 | 465–540 |
| Gas Rate, SCF/B (Incl. Recycle Gas) | 1500–10,000 | 2000–7000 |
| Feed Rate, W/Hr/W | 0.5–10 | 1–3 |

This invention, and its principle of operation, will be better understood by reference to the following demonstrations and examples which illustrate its more salient features. All parts are in terms of weight except as otherwise specified.

EXAMPLES 1–3

For use in conducting reforming tests, series of platinum-iridium (Pt-Ir), platinum (Pt) and platinum-rhenium (Pt-Re) catalysts were prepared by dispersing said metals on an alumina support, or such catalysts purchased from a commercial catalyst manufacturer. Certain catalysts were treated to agglomerate the iridium component upon the alumina support, and the platinum then atomically dispersed, without agglomeration, upon the iridium-containing alumina support to form a platinum-agglomerated iridium (Pt-Agg.Ir) catalyst.

The amount of iridium agglomeration in the iridium-containing catalysts employed in these demonstrations and examples was determined by x-ray diffraction analysis. X-ray line broadening measures crystallite size. The larger the crystallite, the broader and taller the peak seen in the x-ray scan; or, in other words, the larger the area under the curve. All measurements were made relative to a standard, viz. a platinum-iridium catalyst purposely fully agglomerated by calcining in air at 510° C. for 12 hours. The standard was defined as having 100 percent agglomerated iridium and as such showed a certain peak size and area. The peak size and area of catalyst specimens were compared with the standard to provide the percent of agglomeration of a platinum-iridium catalyst of corresponding platinum and iridium metals content. A catalyst specimen that is 50 wt.% agglomerated contains iridium crystallites of sufficient magnitude to give a peak area one-half that of the standard. A catalyst specimen that is agglomerated to an extent equal to that of the standard would give a peak area equal to that of the standard and would be 100 wt.% agglomerated. A catalyst specimen that is agglomerated to a greater extent than the standard would be >100 wt.% agglomerated. The iridium agglomerated catalysts are characterized as containing iridium crystallites falling substantially within a range of 20 to 1000 Angstrom Units, more generally 30 to 500 Angstrom Units, and most often from 30 to 300 Angstrom Units. A discussion on the subject of metals dispersion, the effect of crystallite size on catalytic chemistry, and the analytical techniques used to measure dispersion and the lack thereof (agglomeration) is found in *Chemistry of Catalytic Processes*, B. C. Gates, J. R. Katzer, and G. C. A. Shuit, McGraw-Hill, New York, 1979, pp 236-248. These several catalysts, their identification and character, as well as their method of preparation are identified as follows:

Catalyst A (0.5 wt.% Pt/0.3 wt.% Agg.Ir; Ir having a crystallinity of 110%):

Two hundred g. of alumina extrudates and 300 ml of deionized water were placed in a fritted funnel, and carbon dioxide was passed through the mixture for 30 min. Chloroiridic acid solution (36 ml, 17 mg Ir/ml) was added, and the carbon dioxide was passed through the impregnation mixture 4 hr. The extrudates were air dried and vacuum dried at 110° C. for 4 hr. The extrudates were calcined in air at 950° F. for 3 hr. Iridium oxide crystallinity in this material was 90%. The extrudates were placed in 300 ml of water, and again treated with carbon dioxide. Fifteen ml (60 mg/ml) of chloric stock solution and 40 ml of Pt solution (25 mg/ml) were added, and the impregnation allowed to proceed for 4 hr. The catalyst was dried, calcined at 950° F. for 3 hr., reduced in hydrogen at 932° F. for 17 hr., and sulfided.

Catalyst B (0.3 wt.% Pt/0.3 wt% Agg.Ir; the Ir having a crystallinity of 100%):

The same procedure was followed as in the preparation of Catalyst A except that the reagent quantities were such that a catalyst containing 0.3 wt. % Pt and 0.3 wt. % Ir resulted.

Catalyst C (0.3 wt.% Pt/0.3 wt.% Ir; the Ir crystallinity being <5%):

A commercial 0.3 wt.% Pt-0.3 wt.% Ir catalyst was calcined in air at 750° F. for 3 hr., reduced in hydrogen at 932° F. for 17 hr., and sulfided at 932° F.

Catalyst D (0.3 wt.% Pt/0.3 wt.% Agg.Ir; the iridium crystallinity being 68%):

A portion of Catalyst C was calcined at 950° C. for 3 hr., then reduced and sulfided as in the preparation of said Catalyst C.

Catalyst E (0.6 wt.% Pt):

A commercial catalyst containing 0.6 wt % Pt was air calcined at 932° F. for 3 hr., reduced in hydrogen and sulfided as was Catalyst C.

Catalyst F (0.3 wt.% Pt):

A commercial catalyst containing 0.3 wt. % Pt was air calcined at 932° F. for 3 hr., reduced by contact with hydrogen and sulfided as was Catalyst C.

Catalyst G (0.3 wt.% Pt/0.3 wt % Re):

A commercial catalyst containing 0.3 wt. % Pt and 0.3 wt. % Re was air calcined at 932° F. for 3 hr., reduced in hydrogen and sulfided as was Catalyst C.

Each of these catalysts were first evaluated in a series of runs for heptane reforming at 500° C., 100 psig, 20 W/Hr/W and $H_2$/oil=6, the Pt-Agg.Ir catalyst being compared with the Pt only and Pt-Re catalysts, all of which are commercial reforming catalysts. The results are given in Table I.

The data given in Table I show that all of the Ir-containing catalysts, viz. all of catalysts A, B, C and D, are more active than the Pt catalysts, catalysts E and F, and the Pt-Re catalyst, Catalyst G. Conversion and the rate of aromatization (Toluene formation) are greater for the Ir-containing catalysts. Thus, the general activity credit for the Ir-containing catalysts as a family, i.e., both the agglomerated and non-agglomerated Ir species, is clear.

Comparison between Runs 1 (Catalyst A), 3 (Catalyst C) and 5-7 (Catalysts E, F and G) show that Catalyst A, the Pt-Agg.Ir catalyst containing 110% Agg. Ir, is equivalent to Catalyst C, the Pt-Ir catalyst which contains less than 5% Agg.Ir, in terms of toluene yield and rate constant. Cracking is lower over Catalyst A or the 0.5 Pt-0.3 Ir catalyst, this leading to higher $C_5{}^+$ yield and better toluene selectivity. Thus, this agglomerated Ir catalyst is equal to Catalyst C, the unagglomerated 0.3 Pt-0.3 Ir Catalyst in activity and superior in terms of yield and aromatics selectivity. The Catalyst is also vastly superior to Catalyst E, 0.6 Pt, showing the ability of Ir, though agglomerated, to promote Pt activity. In terms of overall performance based on yield, aromatization activity, and selectivity, Catalyst A, the agglomerated 0.5 Pt-0.3 Ir Catalyst, is superior to all others.

Comparison of Catalyst F, the 0.3 Pt Catalyst, and Catalyst B, the agglomerated 0.3 Pt-0.3 Ir Catalyst, further demonstrates the ability of agglomerated Ir to promote Pt activity. Comparison of the two agglomerated Catalysts, Catalysts B and D, the 0.3 Pt-0.3 Ir Catalysts employed in Runs 2 and 4 respectively show that it makes little difference in the performance of the catalyst whether the Ir component of the Pt-Ir Agg. Catalyst is agglomerated prior to addition of the platinum, or subsequent to coimpregnation of the platinum and iridium.

TABLE 1

| | Heptane Reforming With Pt, Pt—Re, and Pt—Ir Catalysts 500° C., 100 psig, 20 W/H/W, $H_2$/Oil = 6 | | | | | | |
|---|---|---|---|---|---|---|---|
| | Run No. | | | | | | |
| | 1 | 2 | 3 | 4 | 5 | 6 | 7 |
| | Catalyst: | | | | | | |
| | A (0.5 Pt/ 0.3 Ir) | B (0.3 Pt/ 0.3 Ir) | C (0.3 Pt/ 0.3 Ir) | D (0.3 Pt/ 0.3 Ir) | E (0.6 Pt) | F (0.3 Pt) | G (0.3 Pt/ 0.3 Re) |
| Ir Crystallinity % | 110 | 100 | <5 | 68 | — | — | — |
| Yield, Wt. | | | | | | | |
| C1 | 1.5 | 1.2 | 1.8 | 1.3 | 1.1 | 0.9 | 1.5 |
| i-C4 | 2.6 | 2.6 | 2.8 | 2.5 | 2.2 | 2.8 | 3.7 |
| n-C4 | 4.3 | 3.8 | 5.0 | 4.0 | 3.6 | 3.4 | 5.8 |
| $C_5{}^+$ | 83.3 | 85.0 | 80.4 | 84.2 | 86.1 | 86.1 | 78.0 |
| Toluene | 28.5 | 23.5 | 29.0 | 24.5 | 22.7 | 19.4 | 30.5 |
| Conversion, % | 57.1 | 54.9 | 62.7 | 51.5 | 46.8 | 42.8 | 67.8 |
| Toluene Rate | 5.9 | 4.8 | 6.0 | 5.0 | 4.7 | 4.0 | 3.0 |
| Toluene | 49.5 | 46.7 | 46.2 | 47.3 | 48.1 | 45.0 | 45.5 |

TABLE 1-continued

Heptane Reforming With Pt, Pt—Re, and Pt—Ir Catalysts
500° C., 100 psig, 20 W/H/W, H$_2$/Oil = 6

| | Run No. | | | | | | |
|---|---|---|---|---|---|---|---|
| | 1 | 2 | 3 | 4 | 5 | 6 | 7 |
| | | | | Catalyst: | | | |
| | A | B | C | D | E | F | G |
| | (0.5 Pt/ 0.3 Ir) | (0.3 Pt/ 0.3 Ir) | (0.3 Pt/ 0.3 Ir) | (0.3 Pt/ 0.3 Ir) | (0.6 Pt) | (0.3 Pt) | (0.3 Pt/ 0.3 Re) |
| Selectivity % | | | | | | | |

Comparison of the rate of toluene formation over a period of time for each of Catalysts A, C, E and F show that Catalysts A and C provide activity credits, as contrasted with Catalysts E and F, which persist over the run history. In terms of activity in runs made by reaction of n-heptane over each Catalyst at 500° C., 100 psig, 20 W/H/W and H$_2$/Oil=6, the relative activities of the catalysts are as follows, to wit: Catalyst A > Catalyst C > Catalyst E > Catalyst F, over the entire history of the runs.

A further series of runs were made contrasting the differences in performance between Catalyst A and Catalyst C.

The data given in Table 2 contrasts multicycle oxidation/reduction of Catalyst A, the 0.5 Pt-0.3 Ir Catalyst, with that of Catalyst C, the commercial 0.3 Pt-0.3 Ir Catalyst. In this case both catalysts were subjected to multicycle air calcination at 950° F. for 3 hrs. followed by reduction at 932° F. for 17 hrs. to simulate multiple regenerations. After the final reduction the catalysts were sulfided. The data show that Catalyst A, a catalyst of this invention, showed negligible loss in aromatization activity and yield after three regeneration simulations while Catalyst C, the commercial Pt-Ir Catalyst, experienced a serious decline in aromatization activity. The results show the purposely Ir-agglomerated Catalyst exhibits superior multicycle performance.

TABLE 2

Heptane Reforming with Pt—Ir Catalysts
500° C., 100 psig, 20 W/H/W, H$_2$/Oil = 6

| | Run No. | | | | | |
|---|---|---|---|---|---|---|
| | 8 | | | 9 | | |
| | Catalyst | | | | | |
| | A (0.5 Pt/0.3 Ir) | | | C (0.3 Pt/0.3 Ir) | | |
| Cycle | 1 | 2 | 3 | 1 | 2 | 4 |
| Yield, Wt. % | | | | | | |
| C1 | 1.5 | 1.8 | 1.6 | 1.8 | 1.3 | 0.7 |
| i-C4 | 2.6 | 2.7 | 2.7 | 2.8 | 2.5 | 2.1 |
| n-C4 | 4.3 | 5.2 | 4.8 | 5.0 | 4.0 | 2.9 |
| C$_5$+ | 83.3 | 80.6 | 81.7 | 80.4 | 84.2 | 88.5 |
| Toluene | 28.5 | 29.2 | 27.0 | 29.0 | 24.5 | 16.2 |
| Conversion, % | 57.1 | 62.2 | 58.3 | 62.7 | 51.5 | 36.5 |
| Toluene Rate | 5.9 | 6.0 | 5.6 | 6.0 | 5.0 | 3.3 |
| Toluene Selectivity, % | 49.5 | 46.6 | 46.1 | 46.2 | 47.3 | 44.1 |

Catalysts A, B, C, E, F and G were employed to reform a Light Arab paraffinic naptha at cyclic severity. Table 3 shows the activity and yield credits for the Ir-containing Catalysts relative to the Pt-only and Pt/Re Catalysts. The conditions at which the runs were made are given in Table 3.

TABLE 3

Cyclic Reforming Of Light Arab Paraffinic Naphtha
510° C. EIT, 175 psig, 3000 SCF/B, 1.9 W/H/W

| Identification of Catalyst | Activity Hr. | | C$_5$+ LV % at 100 RON At Hr. | |
|---|---|---|---|---|
| | 50 | 100 | 50 | 100 |
| A (0.5 Pt—0.3 Ir) | 100 | 86 | 75.0 | 74.3 |
| B (0.3 Pt—0.3 Ir) | 86 | 55 | 73.6 | 73.0 |
| C (0.3 Pt—0.3 Ir) | 106 | 88 | 73.7 | 72.7 |
| E (0.6 Pt) | 57 | 34 | 74.5 | 74.0 |
| F (0.3 Pt) | 44 | 21 | 69.0 | 58.0 |
| G (0.3 Pt—0.3 Re) | 55 | 32 | 73.6 | 71.6 |

Catalyst A, the agglomerated Ir Catalyst of this invention is shown to be fully equivalent to commercial Catalyst C, i.e., the unagglomerated 0.3 Pt-0.3 Ir Catalyst, in terms of activity and yield. In fact, this catalyst has Pt-Ir type activity with Pt-Re type yields. Catalyst B is more active than Catalysts E, F and G.

The data clearly shows that the Pt-agglomerated Ir catalysts are high activity, high yield catalysts with the characteristic sulfur tolerance and low coke make of Pt-Ir systems. Since the Ir is already in an agglomerated state, Pt-Re type regeneration may be applied without damaging the Ir through crystallite growth. The catalysts of this invention, as demonstrated, appear well suited to cyclic reforming.

EXAMPLES 4-5

Another series of catalysts, Catalysts H and I were prepared as follows:

Catalyst H (0.5 wt.% Pt/0.3 wt.% Agg. Ir; Ir having a crystallinity of 110%):

This catalyst was prepared as in the preparation of Catalyst A except that the Ir impregnated alumina was calcined in air at 950° F. for 17 hr. After calcination, the catalyst was reduced at 932° F. for 17 hr., and sulfided at 932° F.

Catalyst I (0.5 wt.% Pt/0.3 wt.% Agg Ir.; Ir having a crystallinity of 100%).

This catalyst was prepared by simultaneous impregnation of both the Pt and Ir metals followed by air calcination at 950° F. for 3 hr., and reduction and sulfiding as in preparation of Catalyst H.

The catalysts were employed in heptane reforming with results shown in Table 4. The data show that the method of synthesis and calcination severity have no impact on relative performance.

TABLE 4

Heptane Reforming With 0.5 Pt—0.3 Ir Agg. Catalysts
n-Heptane, 500° C., 100 psig, 20 W/H/W, H2/Oil = 6

| | Catalyst | |
|---|---|---|
| | H | I |
| Yield, Wt. % | | |
| C1 | 1.6 | 1.5 |
| i-C4 | 2.4 | 2.4 |

TABLE 4-continued

Heptane Reforming With 0.5 Pt—0.3 Ir Agg. Catalysts
n-Heptane, 500° C., 100 psig, 20 W/H/W, H2/Oil = 6

|  | Catalyst | |
|---|---|---|
|  | H | I |
| n-C4 | 4.4 | 4.4 |
| C5+ | 83.1 | 83.1 |
| Toluene | 28.5 | 28.8 |
| Conversion | 57.9 | 58.1 |
| Toluene Rate | 5.9 | 5.9 |
| Toluene Selectivity | 48.9 | 49.2 |

EXAMPLE 6

Catalyst J was prepared by intimately mixing a 0.6 wt.% Pt catalyst (Catalyst E) with a 0.3 wt.% agg. Ir catalyst so that a catalyst resulted in which the two metals occupied separate alumina particles. In a heptane reforming test, the performance of Catalyst J was identical to that of Catalyst E indicating that the Pt and agglomerated Ir must occupy the same support particle in order for the promotion of Pt activity by agglomerated Ir to occur.

EXAMPLES 7-10

Catalysts K, L, M and N were prepared using the procedure of Catalyst I; the Ir agg. content was 0.3 wt.% while the Pt content varied over the range 0.1-0.7 wt.%. Catalyst K through N were pretreated as in Catalyst I and used in heptane reforming. Reference is made to Table 5.

TABLE 5

Heptane Reforming With Pt—Pt—Ir Agg. Catalysts
n-Heptane, 500° C., 100 psig, 20 W/H/W, H2/Oil = 6

|  | Catalyst | | | |
|---|---|---|---|---|
|  | K | L | M | N |
|  | Pt, Wt. % | | | |
|  | 0.1 | 0.3 | 0.5 | 0.7 |
| Yield, Wt. % | | | | |
| C1 | 1.0 | 1.5 | 1.6 | 1.7 |
| i-C4 | 2.1 | 2.5 | 2.4 | 2.4 |
| n-C4 | 3.4 | 4.3 | 4.4 | 4.8 |
| C5+ | 86.5 | 83.5 | 83.1 | 82.1 |
| Toluene | 18.9 | 24.9 | 28.5 | 30.3 |
| Conversion | 42.5 | 53.8 | 57.9 | 61.2 |
| Toluene Rate | 3.9 | 5.1 | 5.9 | 6.2 |
| Toluene Selectivity | 43.9 | 46.0 | 48.9 | 49.3 |

These results show that a Pt content of 0.3 wt.% is required for the activity of the Pt-Ir agg. catalyst to exceed that of 0.6 Pt only, Catalyst E. Maximum activity occurs at 0.5-0.7 wt.% Pt. These catalysts were tested in naphtha reforming as previously described. Reference is made to Table 6.

TABLE 6

Cyclic Reforming Of Light Arab Paraffinic Naphtha
510° C. EIT, 175 psig, 3000 SCF/B, 1.9 W/H/W

|  | Activity At Hr. | | C5+ LV % At 100 RON At Hr. | |
|---|---|---|---|---|
| Catalyst | 50 | 100 | 50 | 100 |
| K (0.1 Pt—0.3 Ir agg.) | 50 | 30 | 69.0 | 61.5 |
| L (0.3 Pt—0.3 Ir agg.) | 82 | 75 | 73.2 | 71.5 |
| M (0.5 Pt—0.3 Ir agg.) | 94 | 77 | 74.5 | 73.3 |
| N (0.7 Pt—0.3 Ir agg.) | 92 | 73 | 73.8 | 72.9 |
| G (0.3 Pt—0.3 Re) | 55 | 32 | 73.6 | 70.6 |

These data confirm the heptane reforming data. A Pt level of 0.1 wt.% affords a catalyst inferior to the commercial catalyst, G. Performance is optimized in the region of 0.5-0.7 Pt.

EXAMPLES 11-15

Catalysts O through W were prepared as in Catalyst I except that the Pt content was fixed at 0.5 wt.%, and the Ir content was varied over the range 0.01-0.7 wt.%. The catalysts were pretreated as in Catalyst I and employed in both heptane and naphtha reforming tests.

Reference is first made to Table 7 which gives the heptane reforming data.

TABLE 7

Heptane Reforming With 0.5 Pt—Ir Agg. Catalysts
n-Heptane, 500° C., 100 psig, 20 W/H/W, H2/Oil = 6

|  | Catalyst | | | | | | | | | |
|---|---|---|---|---|---|---|---|---|---|---|
|  | E | O | P | Q | R | S | T | U | V | W |
|  | Ir, Wt. % | | | | | | | | | |
|  | 0.0 | 0.01 | 0.02 | 0.03 | 0.05 | 0.08 | 0.1 | 0.3 | 0.5 | 0.7 |
| Yield, Wt. % | | | | | | | | | | |
| C1 | 1.1 | 1.1 | 1.2 | 1.2 | 1.3 | 1.4 | 1.6 | 1.6 | 1.5 | 1.7 |
| i-C4 | 2.2 | 2.3 | 2.4 | 2.2 | 2.3 | 2.2 | 2.6 | 2.4 | 2.4 | 2.7 |
| n-C4 | 3.6 | 3.4 | 3.8 | 3.8 | 3.9 | 4.1 | 4.5 | 4.4 | 4.3 | 4.8 |
| C5+ | 86.1 | 86.3 | 85.2 | 85.6 | 85.2 | 84.5 | 82.5 | 83.1 | 83.5 | 81.5 |
| Toluene | 22.7 | 23.2 | 24.9 | 24.8 | 25.1 | 26.9 | 29.6 | 28.5 | 28.2 | 28.9 |
| Conversion | 46.8 | 47.2 | 50.8 | 49.9 | 50.9 | 53.8 | 59.9 | 57.9 | 56.9 | 60.8 |
| Toluene Rate | 4.7 | 4.8 | 5.1 | 5.1 | 5.1 | 5.5 | 6.1 | 5.9 | 5.8 | 5.9 |
| Toluene Selectivity | 48.1 | 48.8 | 48.5 | 49.4 | 48.8 | 49.6 | 49.1 | 48.9 | 49.2 | 48.3 |

These data show that agglomerated Ir promotes Pt activity at loadings as low as 0.01 wt.%. The activity of the catalysts rises with Ir level to a value of about 0.1 wt.% and becomes independent of Ir loadings at that point.

Several of the catalysts used in heptane reforming were used in naphtha reforming. The results are given in Table 8.

TABLE 8

Cyclic Reforming Of Light Arab Paraffinic Naphtha
510° C. EIT, 175 psig, 3000 SCF/B, 1.9 W/H/W

|  | Activity At Hr. | C5+ LV % At 100 RON At Hr. |
|---|---|---|
| Catalyst | 50 | 50 |
| P (0.5 Pt—0.21 Ir Agg.) | 76 | 75.2 |
| R (0.5 Pt—0.05 Ir agg.) | 97 | 75.5 |
| S (0.5 Pt—0.08 Ir agg.) | 90 | 75.7 |
| T (0.5 Pt—0.1 Ir Agg.) | 101 | 77.5 |
| U (0.5 Pt—0.3 Ir agg.) | 115 | 78.0 |
| V (0.5 Pt—0.5 Ir agg.) | 149 | 77.0 |
| W (0.5 Pt—0.7 Ir agg.) | 140 | 77.0 |
| G (0.3 Pt—0.3 Re) | 55 | 73.6 |

These data show activity and yield credits for the 0.5 Pt-Ir agg. catalysts over the Ir concentration range relative to the commercial catalyst, G.

It is apparent that various modifications and changes can be made without departing from the spirit and scope of the present invention.

Having described the invention, what is claimed is:

1. In a process for catalytically reforming, with hydrogen, a hydrocarbon naptha feed at reforming conditions
   the improvement comprising
   contacting said naphtha feed, and hydrogen, with a halogenated, supported platinum catalyst promoted with iridium agglomerated to exhibit a crystallinity greater than 50 percent, as measured by x-ray.

2. The process of claim 1 wherein the crystallinity of the agglomerated iridium is greater than about 75 percent.

3. The process of claim 1 wherein the crystallinity of the agglomerated iridium is about 100 percent.

4. The process of claim 1 wherein the crystallinity of the agglomerated iridium ranges from about 60 percent to about 100 percent.

5. The process of claim 1 wherein the crystallinity of the agglomerated iridium ranges from about 75 percent to about 100 percent.

6. The process of claim 1 wherein the catalyst contains from about 0.5 percent to about 1 percent platinum, and from about 0.01 percent to about 1 percent iridium, based on the weight of the total catalyst.

7. The process of claim 6 wherein the catalyst contains from about 0.3 percent to about 0.7 percent platinum, and from about 0.1 percent to about 0.7 percent iridium.

8. Th process of claim 1 wherein the catalyst contains from about 0.1 to about 2.5 percent halogen, based on the weight of the catalyst.

9. The process of claim 8 wherein the catalyst contains from about 0.7 to about 1.2 percent halogen.

10. The process of claim 8 wherein the halogen is chlorine.

11. The process of claim 1 wherein the catalyst is sulfided.

12. The process of claim 11 wherein the catalyst contains up to about 0.2 percent sulfur, based on the weight of the catalyst.

13. The process of claim 12 wherein the catalyst contains from about 0.05 percent to about 0.1 percent sulfur.

14. The process of claim 1 wherein the platinum and iridium mtals are supported upon alumina.

15. In a process for catalytically reforming, with hydrogen, a naphtha feed at reforming conditions by
    contacting said naphtha feed with a reforming catalyst which contains from about 0.05 to about 1 percent platinum, from about 0.01 to about 1 percent iridium, from about 0.1 to about 2.5 percent halogen, and sulfur in concentration ranging up to about 0.2 percent
    the improvement wherein
    the iridium component of said catalyst is agglomerated to exhibit a crystallinity greater than 50 percent, as measured by x-ray.

16. The process of claim 15 wherein the crystallinity of the agglomerated iridium is greater than about 75 percent.

17. The process of claim 15 wherein the crystallinity of the agglomerated iridium is greater than about 100 percent.

18. The process of claim 15 wherein the crystallinity of the agglomerated iridium ranges from about 60 percent to about 100 percent.

19. The process of claim 18 wherein the crystallinity of the agglomerated iridium ranges from about 75 percent to about 100 percent.

* * * * *